United States Patent
Arroyo, Jr. et al.

(10) Patent No.: US 8,731,137 B2
(45) Date of Patent: May 20, 2014

(54) INTEGRATED PORTABLE CHECKPOINT SYSTEM

(75) Inventors: Luis E. Arroyo, Jr., Ashburn, VA (US); Andreas F. Kotowski, Rancho Palos Verdes, CA (US); Siva Kumar, Fremont, CA (US); Peter Kant, Arlington, VA (US)

(73) Assignee: Rapiscan Systems, Inc., Torrance, CA (US)

( * ) Notice: Subject to any disclaimer, the term of this patent is extended or adjusted under 35 U.S.C. 154(b) by 499 days.

(21) Appl. No.: 13/035,933

(22) Filed: Feb. 26, 2011
(Under 37 CFR 1.47)

(65) Prior Publication Data

US 2012/0148020 A1 Jun. 14, 2012

Related U.S. Application Data

(60) Provisional application No. 61/308,376, filed on Feb. 26, 2010.

(51) Int. Cl.
*G01N 23/04* (2006.01)

(52) U.S. Cl.
USPC .......................................................... 378/57

(58) Field of Classification Search
USPC ....................................... 378/57, 62; 52/79.8
See application file for complete search history.

(56) References Cited

U.S. PATENT DOCUMENTS

| | | | |
|---|---|---|---|
| 4,711,994 A | 12/1987 | Greenberg | |
| 5,181,234 A | 1/1993 | Smith | |
| 5,490,218 A | 2/1996 | Krug et al. | |
| 5,503,424 A | 4/1996 | Agopian | |
| 5,600,303 A | 2/1997 | Husseiny et al. | |
| 5,838,758 A | 11/1998 | Krug et al. | |
| 6,094,472 A | 7/2000 | Smith | |
| 6,315,308 B1 | 11/2001 | Konopka | |
| 6,507,278 B1 | 1/2003 | Brunetti et al. | |
| 6,543,599 B2 | 4/2003 | Jasinetzky | |
| 6,597,760 B2 | 7/2003 | Beneke et al. | |
| 6,665,373 B1 | 12/2003 | Kotowski et al. | |
| 7,092,485 B2 | 8/2006 | Kravis | |
| 7,110,925 B2 | 9/2006 | Pendergraft et al. | |
| 7,322,745 B2 | 1/2008 | Agrawal et al. | |
| 7,418,077 B2 | 8/2008 | Gray | |
| 7,471,764 B2 | 12/2008 | Kaval | |
| 7,660,388 B2 | 2/2010 | Gray | |
| 7,783,004 B2 | 8/2010 | Kotowski et al. | |
| 7,796,733 B2 | 9/2010 | Hughes | |
| 7,826,589 B2 | 11/2010 | Kotowski | |
| 8,003,949 B2 | 8/2011 | Ryge | |

(Continued)

OTHER PUBLICATIONS

Aviation Security Technologies and Procedures: Screening Passengers and Baggage, Oct. 26, 2001, Daniel Morgan: CRS Report for Congress.

*Primary Examiner* — Irakli Kiknadze
(74) *Attorney, Agent, or Firm* — Novel IP

(57) ABSTRACT

The present specification discloses a portable system for inspecting objects. The system includes a housing adapted to be carried by a vehicle, which houses a metal detector and an X-ray scanner and further includes a deployable boom positioned on a top surface of the housing. Operationally, the system is transported to a location, persons or objects are inspected by the metal detector or X-ray scanner and the boom is deployed to inspect external cargo. The integrated portable checkpoint system provides security screening and inspection equipment with increased operational capabilities in one fully integrated package.

15 Claims, 12 Drawing Sheets

(56) References Cited

U.S. PATENT DOCUMENTS

| | | |
|---|---|---|
| 2003/0025302 A1 | 2/2003 | Urffer et al. |
| 2003/0171939 A1 | 9/2003 | Yagesh et al. |
| 2003/0214407 A1 | 11/2003 | Sweatte |
| 2003/0225612 A1 | 12/2003 | DeSimone et al. |
| 2003/0229506 A1 | 12/2003 | Scott et al. |
| 2004/0051265 A1 | 3/2004 | Nadeau |
| 2004/0120454 A1 | 6/2004 | Ellenbogen et al. |
| 2004/0252024 A1 | 12/2004 | Huey et al. |
| 2005/0024199 A1 | 2/2005 | Huey et al. |
| 2009/0074138 A1* | 3/2009 | Knoespel et al. ............... 378/57 |
| 2009/0167042 A1* | 7/2009 | Chen et al. .................. 296/24.3 |
| 2010/0034451 A1 | 2/2010 | Hughes |
| 2010/0158191 A1 | 6/2010 | Gray |
| 2011/0080999 A1 | 4/2011 | Kaval |
| 2011/0081099 A1 | 4/2011 | Hughes |
| 2011/0096901 A1 | 4/2011 | Kotowski |
| 2011/0129063 A1 | 6/2011 | Bendahan |

* cited by examiner

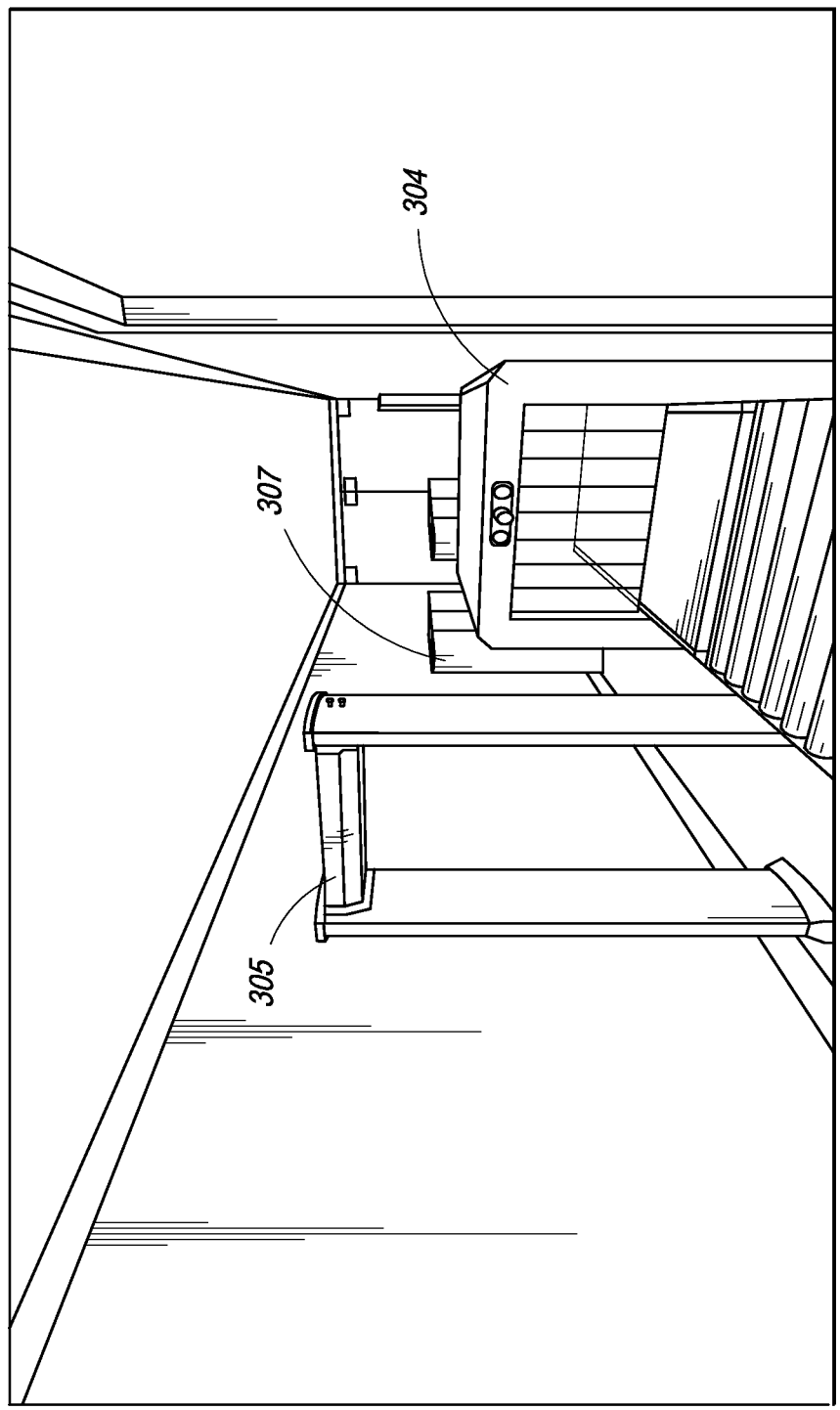

INTEGRATED PORTABLE CHECKPOINT SYSTEM

CROSS-REFERENCE TO RELATED APPLICATIONS

The present specification relies on U.S. Provisional Patent No. 61/308,376, entitled "Integrated Checkpoint Container" and filed on Feb. 26, 2010, for priority and is herein incorporated by reference in its entirety.

FIELD OF THE INVENTION

The present specification relates to apparatuses for, and methods of, securing a location. More specifically, the present specification discloses methods, apparatuses, and integrated systems for screening individuals and their baggage, shoes, and vehicles with improved throughput, efficiency, and quality. The present specification also relates to an integrated, modular, ruggedized checkpoint system, comprising one or more checkpoint containers, in which all screening capabilities are controlled via a single graphical user interface (GUI) and can be deployed in a military context.

BACKGROUND OF THE INVENTION

Protection of deployed military forces is essential to effectively securing the nation. Today, billions of dollars are spent on securing borders and checkpoints in certain regions, at an increasing rate, due to a failure to effectively integrate fielded tools and technologies or to design tools in a manner that withstands the rigors and harsh environmental conditions found in certain regions, such as deserts. These spending increases, while difficult to quantify due to available data on the pace of operations and other factors that might affect costs, tend to have a detrimental effect on society as a whole.

Locations must often be secured to ensure public safety and welfare. For example, places where there are large concentrations of people, such as airports or entertainment events, places that are of particular governmental importance, such as courthouses and government buildings, places where the military is deployed for dangerous missions and other operations, and other places where the threat of violence is high, require security measures to thwart dangerous or illegal activities. The primary security objective is to prevent the unauthorized entry of weapons, dangerous materials, illegal items, or other contraband into the location, thereby securing it. This is often achieved by requiring all people, items and vehicles to enter into the location through defined checkpoints and, in those checkpoints, subjecting those people, items and vehicles to thorough searches.

Currently, various devices are used to perform such searches. Regardless of the place of use, these detection systems are employed to detect the presence of contraband on the body, luggage and vehicles of individuals entering the secure area. Contraband is not limited to weapons and arms, but rather it includes explosives (fireworks, ammunition, sparklers, matches, gunpowder, signal flares); weapons (guns, swords, pepper sprays, martial arts weapons, knives); pressurized containers (hair sprays, insect repellant, oxygen/propane tanks); poisons (insecticides, pesticides, arsenic, cyanide); household items (flammable liquids, solvents, bleach); and corrosives (acids, lye, mercury).

Such conventional security systems rely on data individually recorded by each security device to evaluate the performance of the specific device. For example, a metal detector with an embedded counter records and stores the number of people that passed through the metal detector in a given period of time. Similarly, a baggage screening X-ray machine records the number of bags passed through the system and the number of bags that possibly contained contraband.

In addition, screening checkpoints used in current security systems predominately operate using a single input and single output line approach. Each item must be thoroughly and individually scanned in the conventional systems. The complex security protocols being instituted require individuals to have each of their belongings, including laptops, shoes, coats, mobile phones, keys and other items, scanned by an X-ray scanner.

Further, with limited space and a need to expand, finding suitable space to accommodate additional inspection facilities along the normal process route remains difficult. Additionally, selected locations are not necessarily permanent enough for port operators to commit to the long term installation of inspection equipment. Moreover, systems incorporating high-energy X-ray sources, or linear accelerators (LINAC), require either a major investment in shielding material (generally in the form of concrete formations or buildings) or the use of exclusion zones (dead space) around the building itself. In either case, the building footprint is significant depending upon the size of cargo containers to be inspected.

A mobile inspection system offers an appropriate solution to the need for flexible, enhanced inspection capabilities. Because the system is re-locatable and investing in a permanent building in which to accommodate the equipment is obviated, site allocation becomes less of an issue and introducing such a system becomes less disruptive. Also, a mobile X-ray system provides operators, via higher throughput, with the ability to inspect a larger array of cargo, shipments, vehicles, and other containers.

Conventional re-locatable inspection systems generally comprise at least two booms, wherein one boom will contain a plurality of detectors and the other boom will contain at least one X-ray source. The detectors and X-ray source work in unison to scan the cargo on the moving vehicle. In conventional single boom re-locatable inspection systems, the X-ray source is located on a truck or flatbed and the detectors on a boom structure extending outward from the truck. These systems are characterized by moving-scan-engine systems wherein the source-detector system moves with respect to a stationary object to be inspected. Also, the detectors and the source of radiation are either mounted on a moveable bed, boom or a vehicle such that they are integrally bound with the vehicle. This limits the flexibility of dismantling the entire system for optimum portability and adjustable deployment to accommodate a wide array of different sized cargo, shipments, vehicles, and other containers. As a result these systems can be complicated to deploy and pose several disadvantages and constraints.

For example, in a moving-scan-engine system the movement of the source and detector, relative to a stationary object, may cause lateral twist and lift and fall of the detector or source, due to movement of the scanner over uneven ground, inducing distortions in the scanned images and faster wear and tear of the scanner system. Systems where the weight of the detector or source is held on a boom require high structural strength for the boom in order to have the boom stable for imaging process, thereby adding more weight into the system. Such systems that require a detector-mounted boom to unfold during deployment may cause an unstable shift of the center of gravity of the system off the base, causing the system to tip over. Further, in the case of moving-scan-engine systems using a "swing arm" boom approach, the driver driving the scanner truck is unable to gauge the possibility of hitting the detector box, mounted on a boom, with a vehicle under inspection (VUI), as the detector box is on the other side of the VUI during scanning and not visible to the driver.

Additionally, with moving-scan-engine systems, the truck supporting the scanner system is always required to move the full weight of the scanner regardless of the size and load of the VUI, putting greater strain on the scanning system. Also disadvantageous in conventional systems is that they suffer from a lack of rigidity, are difficult to implement, and/or have smaller fields of vision.

Accordingly, there is need for improved inspection methods and systems built into a fully self-contained, over-the-road-legal vehicle that can be brought to a site and rapidly deployed for inspection. The improved method and system can, therefore, service multiple inspection sites and set up surprise inspections to thwart contraband traffickers who typically divert smuggling operations from border crossings that have tough interdiction measures to softer crossings with lesser inspection capabilities. Moreover, there is an additional need for methods and systems that require minimal footprint to perform inspection and that use a sufficient range of radiation energy spectrum to encompass safe and effective scanning of light commercial vehicles as well as substantially loaded 20-foot or 40-foot ISO cargo containers. It is important that such scanning is performed without comprising the integrity of the cargo and should ideally be readily deployable in a variety of environments ranging from airports to ports of entry where a single-sided inspection mode needs to be used due to congested environments. Similar needs are addressed in U.S. Pat. No. 6,543,599, entitled "Self-Contained Portable Inspection System and Method", which is herein incorporated by reference in its entirety.

Improved methods and systems are additionally needed to keep the relative position between the radiation source and detector fixed to avoid distortion in images caused by the movement of scanner and/or detectors over uneven ground or due to unstable structures. Moreover, there is a need for improved methods and systems that can provide comprehensive cargo scanning in portable and stationary settings. Specifically, methods and systems are needed in which a single boom is employed for generating quality images for inspection. Further, the system should be mounted on a re-locatable vehicle, capable of receiving and deploying the boom.

What is also needed is a single boom cargo scanning system that enables quick and easy deployment, rigidity and tight alignment of the radiation sources and detectors, and a narrow collimated radiation beam, thus allowing for a smaller exclusion zone. In addition, what is needed is an optimal scanning system design that allows for the radiation source to be closer to the Object under Inspection ("OUI"), thereby allowing for higher penetration capability and complete scanning of the target vehicle without corner cutoff. Similar needs are addressed in the U.S. Pat. No. 7,322,745, entitled "Single Boom Cargo Scanning System" which is herein incorporated by reference in its entirety.

Further, in the mobile cargo inspection systems known in the art, the boom structures are typically heavy, thereby causing the overall weight of the scanning system to be close to, or even over the allowable axle load limits. Further, the booms are bulky when stowed such that the vehicle is approximately 4 m high above road level. This makes a mobile scanning system not only difficult to manoeuvre but also restricts its movement in different territories due to the applicable road restrictions on carriage weight. Therefore, there is also a need for a scanning system that can be stowed in a relatively compact area so that it can be easily transported on road, as well as by air. In addition, there is also a need for a scanning system which is light weight, and has a low height and center of gravity in a stowed position, thereby allowing for road transport even in challenging, steep and hilly areas.

What is also needed is a scanning system that can be deployed from a stowed configuration to an operational configuration in operating areas having limited horizontal or vertical clearance.

Therefore, what is needed is an integrated portable checkpoint system that contains the latest security screening and inspection equipment with increased operational capabilities. What is also needed in an integrated checkpoint system that is contained within at least one container. What is also needed is an integrated checkpoint container system that is ruggedized. What is also needed is an integrated checkpoint container system that has a modular design and can be controlled via the same graphical user interface (GUI).

Additionally, there is a need for methods or systems of integrating data from multiple security devices dynamically and communicating such data to a plurality of users, in order to enable effective security.

There is also a need for an intelligently managed security system, where the plurality of information is centrally processed for yielding specific outputs to different users. Also, there is a need to correlate the scanning data of different entities to improve the security level.

SUMMARY OF THE INVENTION

In one embodiment, the present specification discloses a portable system for inspecting objects comprising a housing, defining an enclosed internal volume, adapted to be carried by a vehicle; a metal detector positioned within the enclosed internal volume; an X-ray scanner positioned within the enclosed internal volume and proximate to said metal detector; and a deployable boom, having a length and a width, positioned on a top surface of said housing and external to said enclosed internal volume.

Optionally, the system further comprises a system for non-invasively inspecting a human body scanner. The human body scanner is X-ray based or millimeter wave based. The boom comprises a first vertical portion, a horizontal portion, and a second vertical portion. The top surface has an area defined by a periphery and wherein the length and width of the boom does not extend beyond said periphery when said boom is in an undeployed state. The boom forms an inspection volume when deployed. The inspection volume is defined by the first vertical portion, the horizontal portion, and the second vertical portion, and wherein each of said first vertical portion, the horizontal portion, and the second vertical portion extend beyond said periphery.

In another embodiment, the present specification discloses a system for inspecting objects comprising: a first housing, defining a first enclosed internal volume and having a first top surface, wherein said first housing encloses at least one of a metal detector or an X-ray scanner positioned within the first enclosed internal volume and wherein said first housing is adapted to be carried by a vehicle; a second housing, defining a second enclosed internal volume and having a second top surface, wherein said second housing encloses at least one of a metal detector or an X-ray scanner positioned within the second enclosed internal volume and said second housing is adapted to be carried by a vehicle; and a deployable boom, having a length and a width, positioned on the first or second top surface and external to the first and second enclosed internal volumes.

Optionally, the boom comprises a first vertical portion, a horizontal portion, and a second vertical portion. The first and second top surfaces each have an area defined by a periphery and wherein the length and width of the boom does not extend beyond said periphery of the first or second top surfaces when the boom is in an undeployed state. The boom forms an inspection volume when deployed. The inspection volume is defined by the first vertical portion, the horizontal portion, and the second vertical portion, and wherein each of said first vertical portion, the horizontal portion, and the second vertical portion extend beyond the periphery of the first or second top surfaces.

In another embodiment, the present specification discloses a method for inspecting objects comprising: transporting a housing to a location, wherein said housing defines an enclosed internal volume, has a top surface, and is adapted to be carried by a vehicle, and wherein said first housing encloses at least one of a metal detector or an X-ray scanner positioned within the first enclosed internal volume; inspecting persons or objects in the enclosed internal volume, wherein said inspection is performed using at least one of the metal detector or X-ray scanner; and deploying a boom, having a length and a width, wherein said boom is positioned on the top surface of said housing and is external to said enclosed internal volume.

Optionally, the boom comprises a first vertical portion, a horizontal portion, and a second vertical portion. The top surface has an area defined by a periphery and wherein the length and width of the boom does not extend beyond said periphery when said boom is in an undeployed state. The boom forms an inspection volume when deployed. The inspection volume is defined by the first vertical portion, the horizontal portion, and the second vertical portion, and wherein each of said first vertical portion, the horizontal portion, and the second vertical portion extend beyond said periphery. The method further comprises inspecting persons in the enclosed internal volume, wherein said inspection is performed using a human body scanner. The scanner is X-ray based or millimeter wave based. The method further comprises inspecting cargo external to the housing by passing said cargo through said inspection volume. The method further comprises inspecting cargo external to said housing by passing said inspection volume past said cargo.

The aforementioned and other embodiments of the present shall be described in greater depth in the drawings and detailed description provided below.

BRIEF DESCRIPTION OF THE DRAWINGS

These and other features and advantages of the present invention will be further appreciated, as they become better understood by reference to the detailed description when considered in connection with the accompanying drawings:

FIG. 3a is an inner perspective view of one embodiment of the integrated checkpoint container of the present invention, showing a metal detector and a baggage screening area;

DETAILED DESCRIPTION

Figure 1:
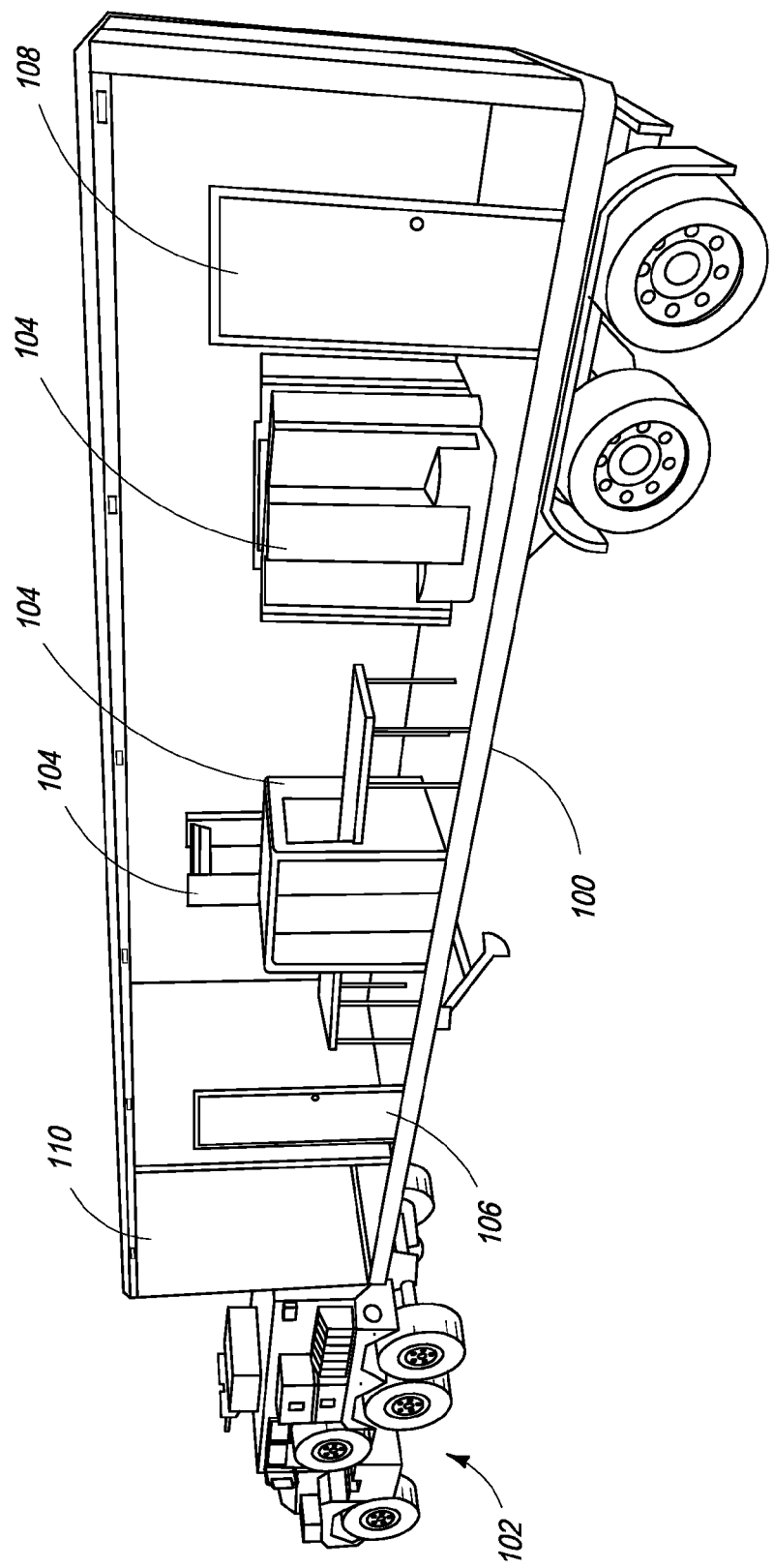
FIG. 1 is an illustration of one embodiment of the integrated checkpoint system of the present invention comprising a single integrated checkpoint container and a tractor used to mobilize the integrated checkpoint container.

The present invention is directed towards an integrated portable checkpoint system that provides security screening and inspection equipment with increased operational capabilities in one fully integrated package.

The present invention is also directed towards an integrated portable checkpoint system wherein several different screening sensors are placed within at least one checkpoint container and, in one embodiment, at least one additional screening sensor is positioned external to said checkpoint container.

The present invention is also directed towards a ruggedized integrated portable checkpoint system that, in one embodiment, comprises a single ruggedized integrated checkpoint container and in another embodiment comprises more than one ruggedized integrated checkpoint containers.

In another embodiment, the present invention is directed towards an integrated portable checkpoint system having a modular design where all screening and inspection systems are integrated into an intuitive GUI (Graphical User Interface), thus enhancing benefits to the operator.

In addition, the integrated portable checkpoint container system comprises at least one container, which can be towed using an appropriate tractor. The present invention is also directed towards a modular, integrated portable checkpoint system wherein the inspection modules are strategically placed to allow for high throughput and enhanced screening capability. In addition, the present invention is directed towards improved threat detection algorithms that-facilitate operator access to actionable and comprehensive threat detection intelligence of person, parcel or vehicle-borne improvised explosive devices (IEDs) and other potential threats.

Driven by end user operational requirements, the integrated portable checkpoint system of the present invention is built to standards which are rendered operationally suitable for harsh environments and then integrated with other tools critical to the operator in order to sustain in-theater activities and efforts in connection with the global war on terrorism.

The present invention is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In one embodiment, the integrated portable checkpoint system of the present invention is a ruggedized, integrated security screening solution for in-theater applications. The checkpoint system of the present invention is directed towards integrating a suite of modular ruggedized inspection systems into a plurality of mobile containers to provide a turn-key entry control checkpoint in unimproved terrain. In one embodiment the suite of modular inspection systems is comprised in a single ruggedized mobile container. In another embodiment, the suite of modular inspection systems is comprised in more than one ruggedized mobile containers and in one specific embodiment, two mobile containers. The at least one ruggedized containers serve as a modular checkpoint that house screening equipment for personnel, baggage, vehicles, and footwear. The plurality of containers are designed to be transported into forward deployed locations using military cargo aircraft, such as but not limited to a C130 aircraft; towed by a vehicle, such as but not limited to an MRAP or similar vehicle; and dropped in place at the desired checkpoint locations that might have unimproved terrain.

In one embodiment, ruggedization includes, but is not limited to, weatherproofing and retrofitting systems such that they can be deployed in adverse conditions and uneven terrain. In one embodiment, the container walls are reinforced steel having a thickness that will provide shielding for the operators when the container is deployed in a hostile locale. In one embodiment, the container includes reflective siding, insulation, and a temperature control system to create comfortable operating conditions, regardless of the outside weather. The checkpoint system of the present invention is suitable for operation worldwide, indoors and outdoors, in all types of weather conditions (rain, blowing sand, fine particulate dust, snow, humidity, direct sunlight, etc.) and in temperatures ranging from −20 degrees to 60 degrees Celsius.

U.S. Pat. No. 7,471,764 ("the '764 patent"), assigned to the assignee of the present invention, is herein incorporated by reference in its entirety. The '764 patent describes "a radiation inspection system, such as an X-ray system, that can operate efficiently even in inclement weather conditions while being highly mobile. Thus the improved inspection system of the present invention is capable of operating in high temperature and corrosive environments and is designed to withstand moisture, dirt and/or dust from the articles of inspection as well", and more specifically "[a]n X-ray imaging system for scanning an object comprising: an X-ray source encased in a first enclosure, wherein said first enclosure has a first side, a second side, and an underside with an external surface; a conveyor belt assembly having a first end and a second end, wherein said conveyor belt assembly is arranged to loop around the external surface of the underside of said first enclosure and wherein the first end extends beyond the first side of the first enclosure and the second end extends beyond the second side of the first enclosure; an electronic system for controlling the X-ray source and conveyor belt, wherein said electronic system is encased in at least one second enclosure; a base frame physically integrated with at least one of said first or second enclosures, wherein said base frame comprises a connector for transporting the system; a first protective casing that is configured to fully cover the first end of said conveyor belt assembly and physically attach to said first enclosure and said base frame, a second protective casing that is configured to fully cover the second end of said conveyor belt assembly and physically attach to said first enclosure and said base frame, and a display device for presenting an image of said object to an operator." In addition, U.S. Pat. No. 7,783,004 and U.S. patent application Ser. No. 12/848,985 are also herein incorporated by reference in their entirety.

In addition, the integrated checkpoint system of the present invention includes blast mitigation barriers; multi-towing and transport features; sunshades; ergonomic entry, personnel traffic lane, and exit of the plurality of containers; trace detection technologies for the indoor checkpoint; and other orthogonal technologies as deemed needed based upon operational requirements and locality.

In another embodiment, the checkpoint container of the present invention is fabricated from materials having a particular thickness to allow for blast mitigation. It should be noted herein that the materials used for blast mitigation also factor into consideration the use of the checkpoint container, the location of where it will be deployed and how it will be transported. It should be understood by those of ordinary skill in the art that there is a trade-off between the degree of blast protection afforded and the resultant weight of the checkpoint container. Thus, certain materials may be used in ground transported configurations while other materials may be used in a checkpoint container that is transported by air.

In one embodiment, the present invention is directed towards a modular checkpoint comprising at least one internal and one external checkpoint module. In various embodiments, the checkpoint modules can be either external or internal depending upon the requirements at the deployment location. In addition, the individual modules may be ruggedized to allow for external operation in various inclement environments. In one embodiment, the modules within the container are encased within foam lined aluminum cases to prevent damage when traveling over uneven terrain.

In one embodiment, the present invention is directed towards a modular checkpoint comprising at least one internal checkpoint. In one embodiment, the at least one internal checkpoint comprises systems for metal detection, baggage screening, and/or people screening. The screening equipment available to the checkpoint operator includes, in one embodiment, a ruggedized dual-view baggage scanner similar to that found at an airport screening checkpoint to detect explosive devices and weapons hidden in luggage or backpacks and an integrated metal detector and shoe screening system for detecting weapons and shoe bombs. In one embodiment, the screening equipment also includes a full body scanner. In one embodiment, the screening equipment also includes an external vehicle scanner, as described below. All of these systems are operated with an integrated graphical user interface (GUI) to ease usability. With regards to the vehicle scanner, the present invention generates a graphical representation, i.e., an image, of the densities of the contents of the vehicle under inspection. This allows for easy visual interpretation of the results of the scanning of the OUI. Advantageously, the preferred software system also causes the display of a reference image simultaneously with the image generated in response to the vehicle under inspection, so that an operator of the present embodiment can easily make a visual comparison between what an object of the type being inspected should "look like", and what the OUI actually "looks like". Such "side-by-side" inspection further simplifies the detection of contraband using the present embodiment.

FIG. 1 is an illustration of a first embodiment of the integrated portable checkpoint system of the present invention comprising a single container and a tractor used to mobilize the integrated portable checkpoint container. In one embodiment, the integrated portable checkpoint container 100 is towed to a destination site by MRAP vehicle 102. In one embodiment, checkpoint container 100 comprises at least one internal checkpoint module 104. In order to allow for ingress and egress into and out of the internal checkpoint, in one embodiment the container includes an entrance door 106 on one end of one side of the container and an exit door 108 on the opposite end of the same side of the container to facilitate the flow of traffic.

In one embodiment, the at least one internal checkpoint module 104 is a baggage scanner similar to ones used at airports to scan carry-on luggage. A conveyor system passes baggage through a housing in which the baggage is subjected to x-rays in order to create an image of the internal contents of said baggage. The image is then transmitted for viewing on a GUI.

In one embodiment, the at least one internal checkpoint module 104 is a metal detector/shoe scanner, similar to ones used in airports to scan individuals prior to boarding. Individuals pass through a stationary rectangular detector that uses oscillation to create a magnetic field and detect metal on said individuals. U.S. patent application Ser. No. 12/948,738 is herein incorporated by reference in its entirety as one embodiment of a shoe scanner that can be employed with the integrated checkpoint container of the present invention.

In one embodiment, the at least one internal checkpoint module 104 is a people screener. In one embodiment, the people screener is a full body scanner utilizing backscatter x-ray technology. In another embodiment, the people screener is a full body scanner utilizing millimeter wave technology. In one embodiment, the full body scanner is an active millimeter wave scanner. In another embodiment, the full body scanner is a passive millimeter wave scanner. In one embodiment, the screening equipment available for people screening includes a ruggedized backscatter X-ray personnel screening system designed to detect suicide bomber threats at a pre-determined standoff location. In one embodiment, the personnel screening system provides real-time 3-D imaging of persons and the items they carry and implements automated threat identification methods for detecting inorganic and organic threat items concealed on persons. U.S. Pat. No. 5,131,234, assigned to the applicant of the present invention is also incorporated herein by reference in its entirety.

Further U.S. Pat. Nos. 6,094,472; 6,665,373; 7,418,077; 7,660,388; 7,796,733; and 7,826,589; also assigned to the Applicant of the present invention, are herein incorporated by reference in their entirety.

Further, U.S. patent application Ser. Nos. 12/643,021; 12/262,631; 12/887,510; 12/849,987; 12/142,978; 12/888,412, also assigned to the application of the present invention, are herein incorporated by reference in their entirety.

Still further, U.S. Provisional Patent Application Nos. 61/313,773; 61/313,772; 61/423,585; 61/423,582; 61/423,586, also assigned to the application of the present invention, are herein incorporated by reference in their entirety.

FIG. 1 also shows operator area 110, for housing a workstation that can be operated by security personnel. Suitable ballistic and blast protection is provided for the operator area 110. In one embodiment, the operator is remotely stationed, for example, in an exclusion zone at a distance ranging from a few feet to a few meters, and can operate the internal checkpoint modules through a secure wireless network connection. In addition, in one embodiment, the external or outdoor checkpoint focuses on vehicle screening operated by a checkpoint operator/screener located inside the operator area in case of the single container checkpoint system or any one of the plurality of containers in case of more than one container checkpoint system. The screener will maintain visual control over the checkpoint with ruggedized windows and CCTV cameras.

In one embodiment, the integrated checkpoint system of the present invention allows for associating and identifying an individual with his/her baggage, vehicle and other personal effects.

In one embodiment, the integrated checkpoint system of the present invention offers improved throughput, efficiency, and quality—the system of the present invention can be operated by two personnel screeners. In conventional systems, each screening system required its own operator to manage the interface. However, since the present invention has an integrated GUI for operating all modules, only two operators are required—both in case of the single container checkpoint system as well as in case of the more than one container checkpoint system. This lends to efficiency as there is less people in the communication chain.

Persons of ordinary skill in the art should appreciate that the integrated checkpoint system of the present invention is reconfigurable in terms of the choice of combination of screening equipment to be used. In embodiments where more than one container is deployed, the integrated checkpoint system of the present invention is reconfigurable in terms of not only the choice of combination of screening equipment but also the distribution of such screening equipment across the multiple containers.

Figure 2:
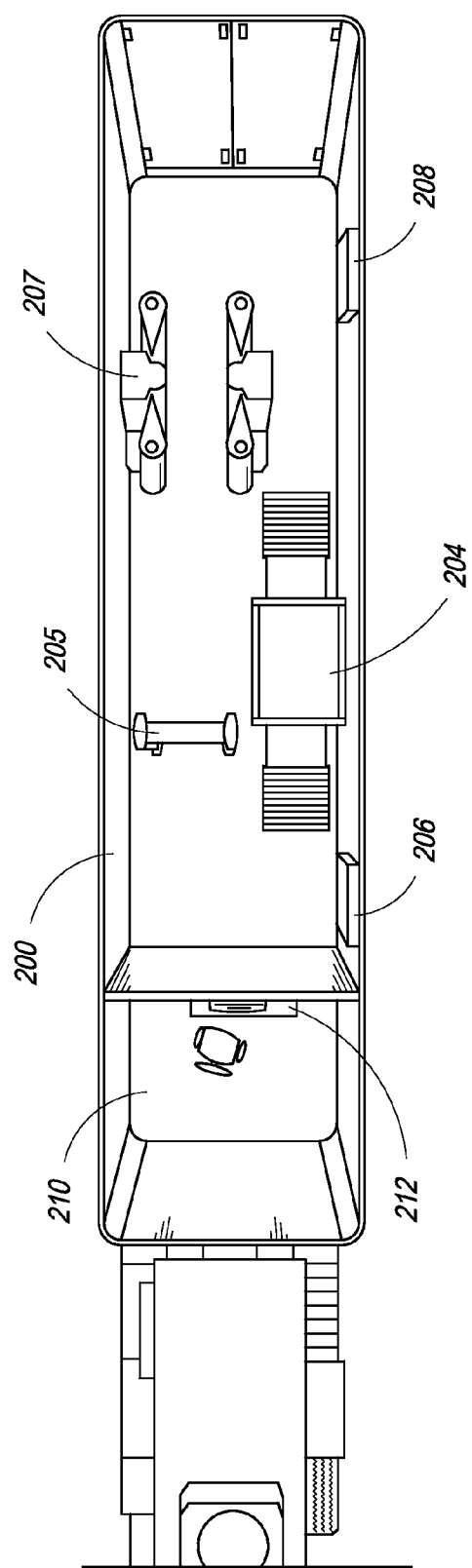
FIG. 2 is a top plan view illustration of the inner contents of one embodiment of the integrated checkpoint container of the present invention, showing the overall layout.

FIG. 2 is a top plan view illustration of the inner contents of one embodiment of the integrated checkpoint container of the present invention, showing the overall layout. As shown in FIG. 2, container 200 shows baggage scanner module 204, metal detector/shoe scanner module 205, and people screener module 207. In order to operate the internal checkpoint, in one embodiment, the container includes an entrance door 206 on one end of one side of the container and an exit door 208 on the opposite side of the container to facilitate the flow of personnel traffic. In addition, container 200 includes operator room 210, which further comprises an operator workstation 212 with a computer for operating the graphical user interface (not shown).

FIG. 3a is an inner perspective view of one embodiment of the integrated checkpoint container of the present invention, showing a baggage screening module 304, metal detector module 305 and people screening module 307.

Figure 3B:
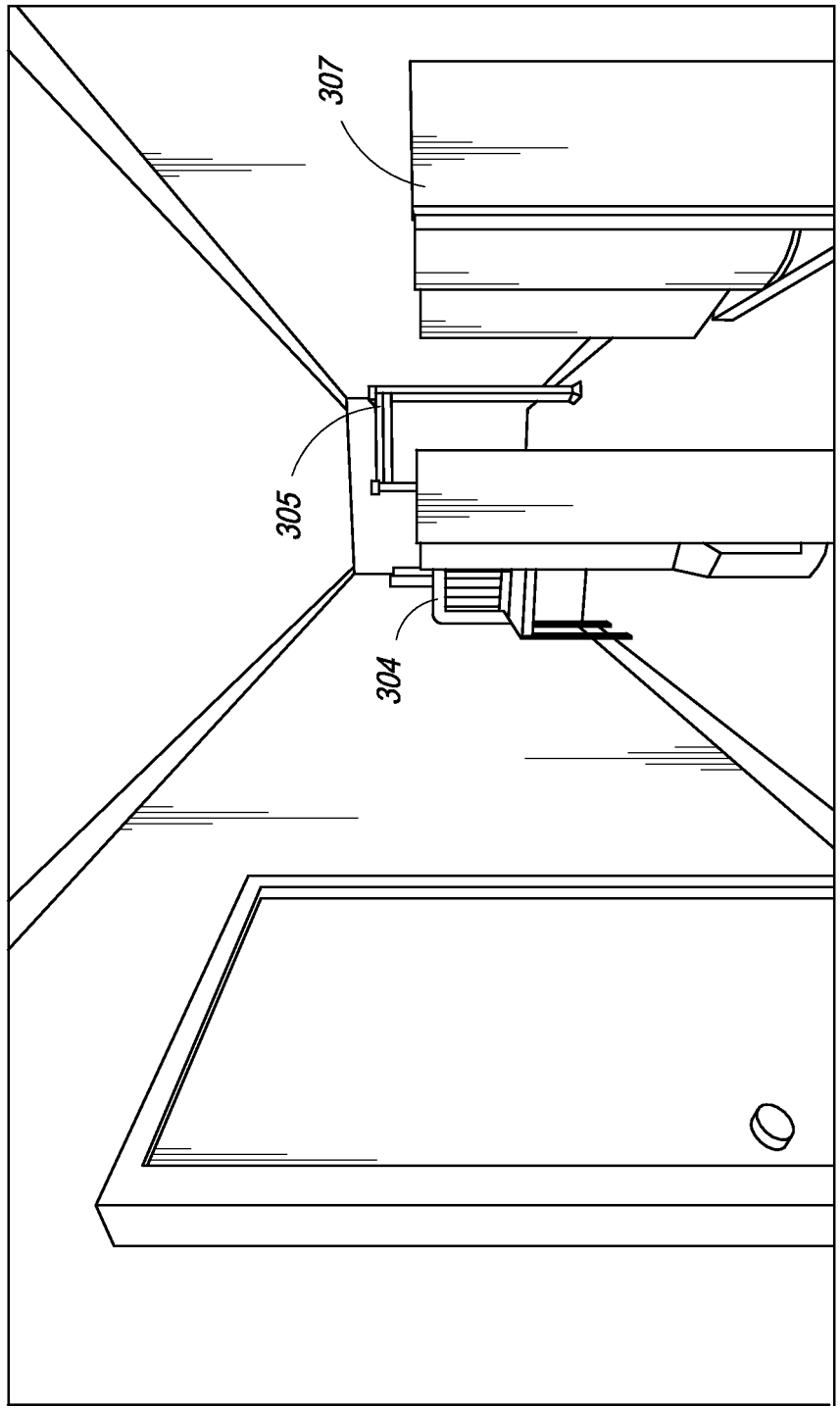
FIG. 3b is an inner perspective view of one embodiment of the integrated checkpoint container of the present invention, showing a personnel scanner.

FIG. 3b is an inner perspective view of one embodiment of the integrated checkpoint container of the present invention, further showing a people screening module 307, in addition to baggage screening module 304 and metal detector 305.

Figure 4A:
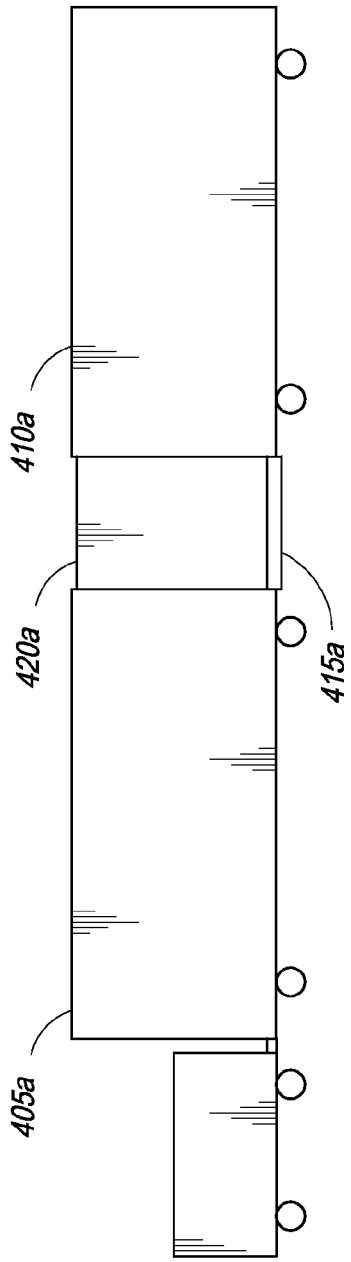
FIG. 4a is an illustration of one embodiment of the integrated checkpoint system of the present invention comprising two checkpoint containers coupled to each other.
Figure 4B:
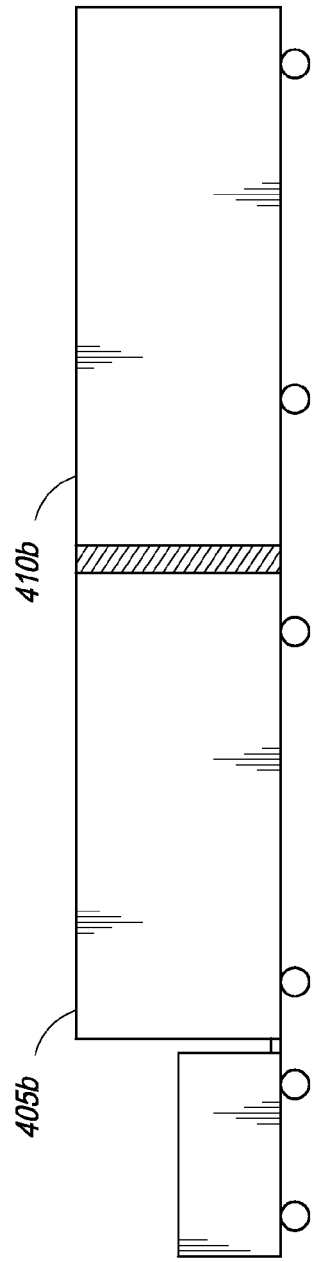
FIG. 4b is another illustration of the embodiment of FIG. 4a where a single container is parsed into two separate, modular portions.

In one embodiment, the integrated checkpoint system of the present invention is directed towards integrating the suite of modular ruggedized inspection systems into a plurality of mobile containers that are coupled to each other to provide a turn-key entry control checkpoint in unimproved terrain. One embodiment of the present invention comprises two coupled mobile containers. As shown in FIG. 4a, in one embodiment, the two mobile containers 405a, 410a are coupled to each other using suitable towing mechanism 415a evident to those of ordinary skill in the art. In one embodiment, a transition cabin, chamber or duct 420a is optionally available over the towing mechanism 415a. This transition cabin, chamber or duct 420a can enable personnel to walk through from one cabin to another via doors, such as a back door in the first container 405a and a front door in the second container 410a. In yet another embodiment, as shown in FIG. 4b, the two mobile containers are actually two physically separated portions 405b, 410b in an otherwise single container.

In this embodiment, the two mobile containers 405b, 410b together house a suite of equipment for screening personnel, baggage, vehicles, and footwear. In one embodiment, the first mobile container 405b comprises at least one internal checkpoint module while the second mobile container 410 comprises at least one external checkpoint module. As described earlier, the internal checkpoint modules comprise any one or a combination of a baggage scanner, a metal detector/shoe scanner or a people scanner. Similarly, the external checkpoint modules comprise a deployable boom with detector array for non-intrusive vehicle and/or cargo screening and inspection, as described below. In one embodiment, both containers 405b, 410b are of same size while in alternate embodiments the containers are of differing sizes depending upon, for example, the type(s) of screening equipment comprised therein. Thus, in accordance with an aspect of the present invention the plurality of modular screening systems for personnel, baggage, footwear, vehicles and cargo are advantageously distributed in two or more containers or container portions.

In one embodiment, the modular checkpoint comprises at least one external checkpoint in addition to the at least one internal checkpoint. In one embodiment, the at least one external checkpoint comprises an outdoor checkpoint for people screening and a deployable boom with detector array for non-intrusive vehicle screening and inspection.

In one embodiment, the external checkpoint comprises a detector array physically attached to a single, movable boom having a proximal end and a distal end and at least one source of radiation wherein the radiation source is attached to the proximal end of the boom or to the container and adjustable to a desired scanning height. The image is generated by introducing target objects between the radiation source and the detector array, thereby exposing objects to radiation and subsequently detecting the radiation. The boom can be unfolded from a first stowed configuration to a second deployed and operational configuration. In one embodiment, when in the first stowed configuration, the deployable boom with detector array folds into a compact configuration and is stowed within a cutout atop the container. In one embodiment, when in the second deployed and operational configuration, the deployable boom with detector array folds out to form an inverted U-shaped scanning tunnel.

Scanning aperture of the boom structures/configurations is typically 2000 mm (H)×2000 mm (W) minimum up to 5300 mm (H)×4000 mm (W) maximum. In multiple embodiments, booms may alternatively be configured with a tunnel aperture outside these dimensions, such as 1000 mm (H), 3000 mm (H), 6000 mm (H), 7000 mm (H), 1000 mm (W), 3000 mm (W), 4500 mm (W), 5000 mm (W), 5500 mm (W), 6000 mm (W), 6500 mm (W), and any dimensions in between but is not limited to such dimensions It should be noted herein that the scanning aperture is also dependent upon geographical requirements and deployment requirements.

In one embodiment, the deployable boom with detector array is conveyed along the length of the container, from a point proximate the rear axle to a point proximate the front of the container, via a rail guide system.

In one embodiment, the external boom scanner can be deployed or stowed while the internal scanners are in use. In one embodiment, use of the internal scanners must cease momentarily while the external boom scanner is being deployed or stowed. Once deployed, the external boom scanner can be used independently from or simultaneously with the internal scanners.

The external checkpoint system of the present invention is advantageous in that it provides a highly compact stowed configuration and has a low height, among other benefits. The external checkpoint system of present invention provides a sturdy deployed configuration with the radiation source and detectors readily aligned and a selectable scan angle position, and can be converted from a stowed configuration to a deployed and operational configuration in areas having limited horizontal and vertical clearance. Further, the external checkpoint system of the present invention is capable of using either a small or a large LINAC, at both high as well as low energies. It may also be used with conventional sources of radiation.

In one embodiment, the present invention is directed toward a new boom configuration for the external checkpoint system, which addresses many of the issues that affect boom designs known in the art. The boom design of the present invention provides for a light weight scanning system, and the boom can also be stowed in a compact manner. This makes the resulting mobile inspection vehicle highly maneuverable. Further, owing to its low axle weights, the mobile inspection vehicle is not subject to any road restrictions and can freely move across all territories in the world.

Further, since the boom is collapsible to a small volume (of 1.5 m (H)×1.2 m (W)×5.0 m (L) in one embodiment) when stowed, the overall height of the inspection container is substantially reduced when configured for transport. This further allows transport of the vehicle by aircraft (such as a C-130 military transporter) for rapid deployment where appropriate.

Still further, the X-ray system of the present invention is designed to operate in rugged conditions such as those employed in military applications. As described earlier, the compact nature of the boom design, in particular its fold-flat capability, makes the mobile inspection system of the present invention uniquely suited to military applications where it may be frequently required to transport the X-ray system in its stowed condition in aircraft or helicopters. Such frequent transportation is not feasible with other known boom configurations, where the height of the boom in its stowed condition is greater than that allowed for military transport. Further, the compact configuration lends a low center of gravity for better stability of the inspection system during road transport, as there is often a need for driving the inspection system in hilly areas, border crossings, and steep mountainous areas.

It should be appreciated that the various mechanical and/or hydraulic movements described herein can occur by manual manipulation of the physical structures or hydraulic components or, as is preferred, by signals transmitted by a controller. In one embodiment, a computing device with a graphical user interface is deployed to receive user commands, transmit user commands to controllers that are in data communication with the various boom, bracket, winch, and/or hydraulic components described herein, and receive data from the controllers indicative of the state of each of the various boom, bracket, winch, and/or hydraulic components described herein. Any computing device and controller system can be used, including laptops, mobile devices, desktop components, and X-ray control centers, and any form of data communication can be used, including wired or wireless communications.

U.S. patent application Ser. Nos. 12/784,630 and 12/784,465, assigned to the applicant of the present invention describes "an improved method and system for inspecting receptacles and/or cargo containers using a single boom placed on a turntable with pivot points to allow for folding and unfolding of the boom, such that the inspection system is relatively compact in a stowed configuration and has a low center of gravity lending to greater stability", and is herein incorporated by reference in its entirety. Further, U.S. Pat. Nos. 7,486,768; 7,322,745; 6,843,599; 7,369,463; 7,517,149; 7,519,148; 7,720,195; 7,817,776; 7,876,870; U.S. patent application Ser. Nos. 12/753,976; 12/339,591; 12/848,977; 12/834,890; and U.S. Provisional Patent Application Nos. 61/440,835 and 61/440,834, all assigned to the applicant of the present invention, are herein incorporated by reference in their entirety.

Figure 5:
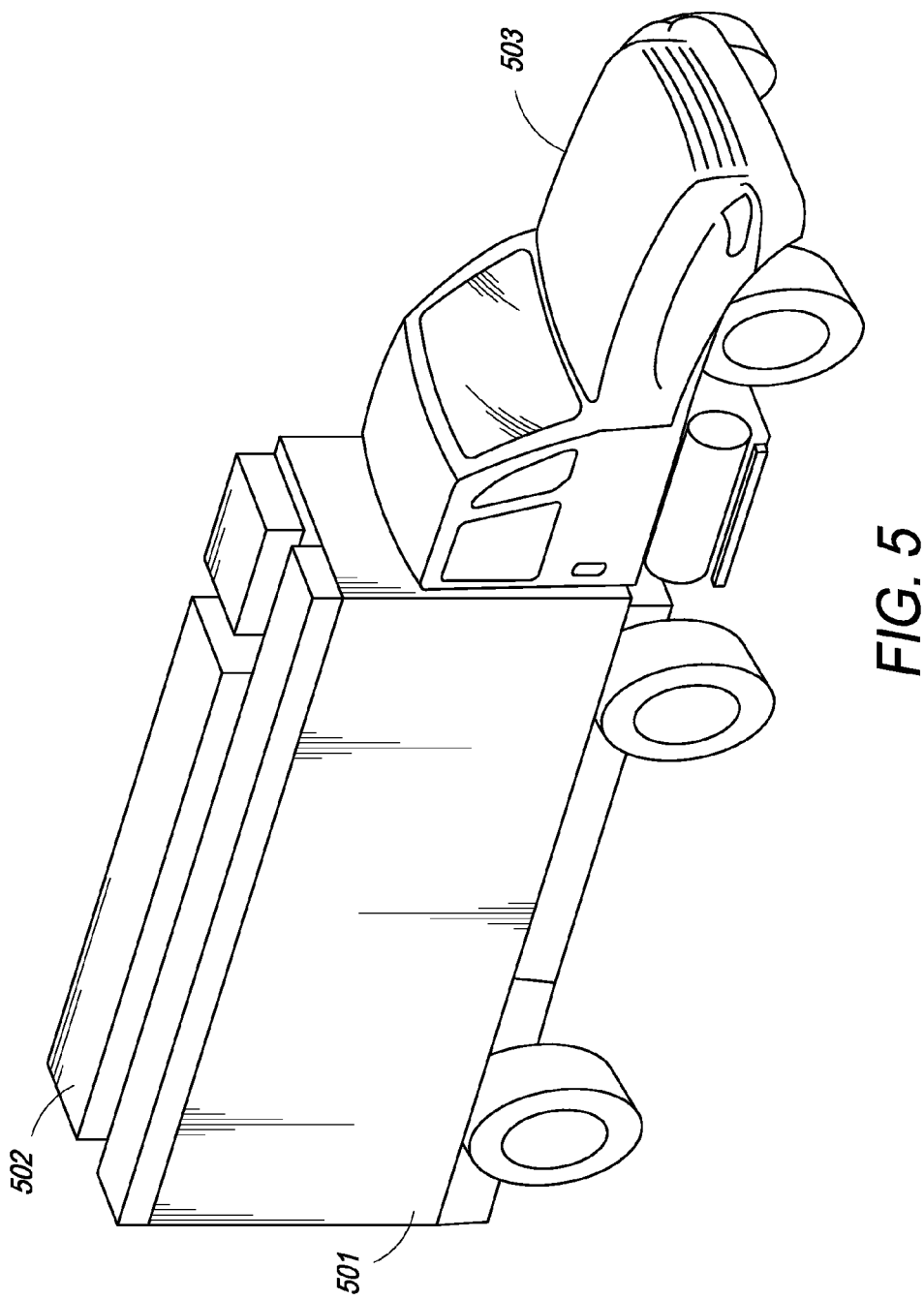
FIG. 5 is an illustration of one embodiment of the mobile inspection container of the present invention in its normal transportation mode wherein the boom is stowed on the top surface of the container.

FIG. 5 illustrates one embodiment of the mobile inspection container 501 of the present invention in its normal transportation mode wherein the boom 502 is stowed on the top surface of the container. In the embodiment of FIG. 5, the inspection container 501 is towed by a truck 503 and the boom 502 in the stowed condition lies substantially parallel to the container 501.

Persons of ordinary skill in the art should note that the maximum standard overall vehicle dimension of a truck is typically 12 m (L)×2.5 m (W)×4 m (H). However, the overall footprint of the inspection container and truck, with the compact boom when stowed thereon, is 11 m (L)×2.5 m (W)×4 m (H) in accordance with one embodiment. In multiple embodiments, the overall dimensions of the truck and container with the compact boom in the stowed configuration are less than or equal to 12 m (L)×2.5 m (W)×4 m (H), allowing the truck and container to be driven legally on nearly all state, federal, and local routes. The compact design of the container with the stowed boom offers a substantially small overall size for the inspection container when used with a full size inspection tunnel of 4.6 m (H)×3.5 m (W) typically.

The boom of the present invention is designed with the above requirements in mind. The following embodiments are meant to be exemplary in nature and do not exclude the use of similar boom embodiments which satisfy the requirements listed above.

In a first embodiment, the boom of the present invention operates in a standard fashion and comprises a vertical support section, a horizontal boom section, and a vertical boom section.

Figure 6A:
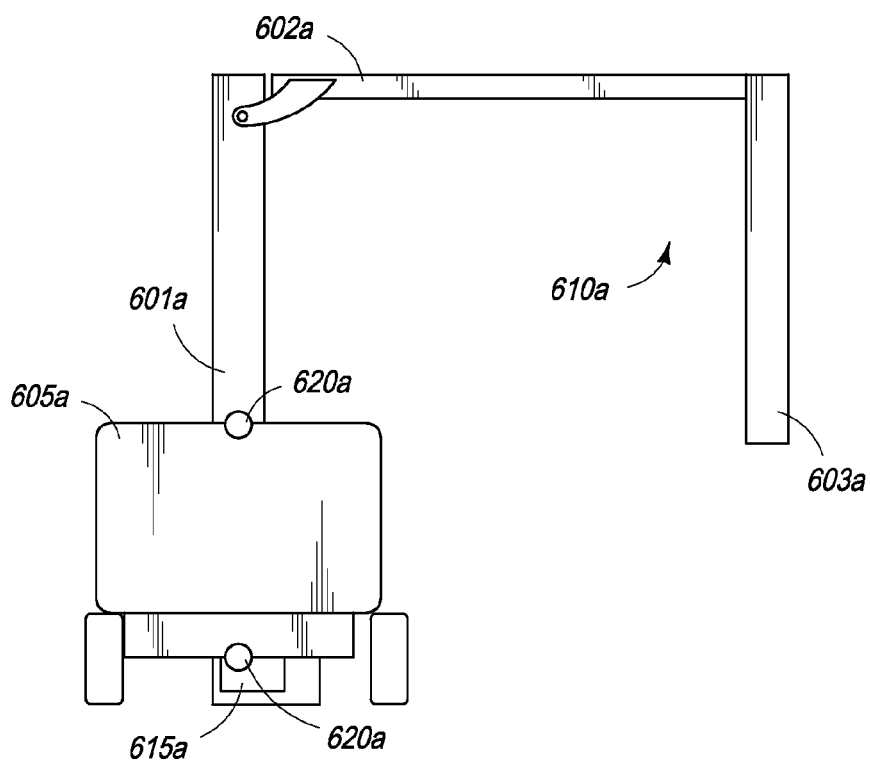
FIG. 6a is a rear view block diagram of one embodiment of a standard design of the boom of the present invention when fully deployed.

FIG. 6a shows one embodiment of a standard design of the boom 610a of the present invention when fully deployed. The boom comprises three sections: vertical support 601a, horizontal boom 602a, and vertical boom 603a. The vertical support 601a is attached to a horizontal rail or gantry system 620a mounted on the top of the container 605a. An X-ray source 615a is attached to a horizontal rail or gantry system 620a mounted to the underside of the container 6605a. The boom portions are not shown to scale.

Figure 6B:
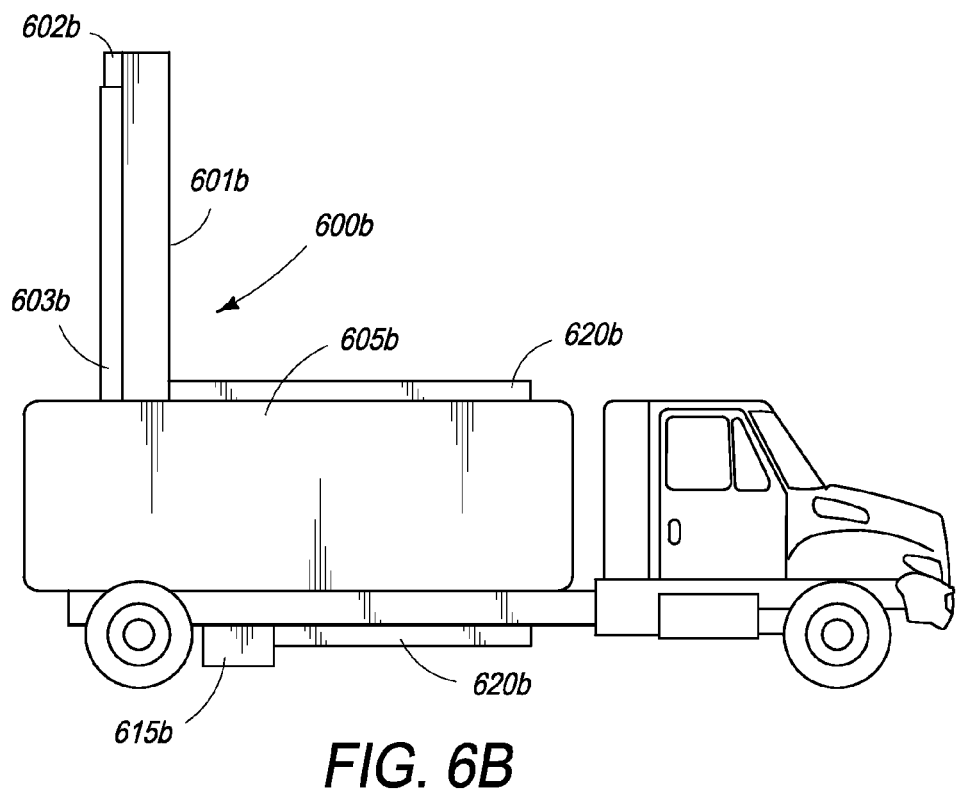
FIG. 6b is a side view block diagram of one embodiment of a standard design of the boom of the present invention when fully deployed.

FIG. 6b is a side view block diagram of one embodiment of a standard design of the boom 600b of the present invention when fully deployed. As mentioned, the boom design of the present invention comprises three components—vertical support 601b, horizontal boom 602b and vertical boom 603b, which in the stowed configuration can be folded parallel to each other in a manner that the total space occupied by the boom is minimized. An X-ray source 615b is attached to the underside of the container 6605b. The boom 600b and X-ray source 615b are fixed to a horizontal rail or gantry system 620b that allows for horizontal sliding of both components along the length of the container 601b, between the rear axle and the front of the container 601b. Movement along the rail or gantry system 620b is synced and controlled by a computer so that the two components remain calibrated during use. Lateral movement of the boom 600b and X-ray source 615b is achieved through use of the GUI. Once the boom has been deployed, in one embodiment, the vehicle is scanned by being driven through the scanner. In another embodiment, the vehicle is scanned by being conveyed over a rail guide system. In another embodiment, the vehicle remains stationary and the scanner conveys along the length of said rail or gantry system and scans the vehicle.

Since the boom is collapsible to a small volume (of 1.5 m (H)×1.2 m (W)×5.0 m (L) in one embodiment) when stowed, the overall height of the inspection vehicle is substantially reduced when configured for transport. This further allows transport of the vehicle by aircraft (such as a C-130 military transporter) for rapid deployment where appropriate.

Referring now to FIGS. 6a and 6b together, the vertical support sections 601a, 601b are manufactured using a strong material, which in one embodiment is steel. One of ordinary skill in the art would appreciate that other engineering materials such as carbon fiber composite, aluminum or metal-composite structures may also be used.

Figure 6C:
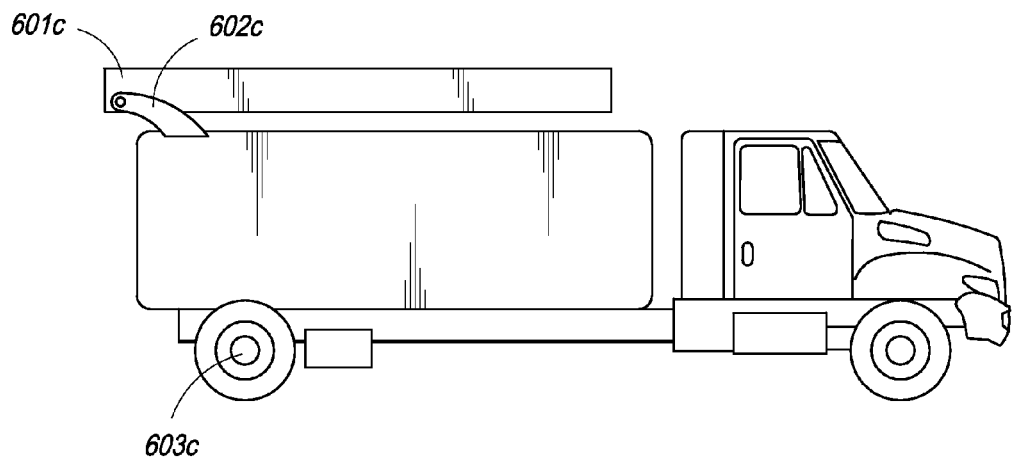
FIG. 6c is a side view block diagram of one embodiment of a standard design of the boom of the present invention when stowed atop the container.
Figure 6D:
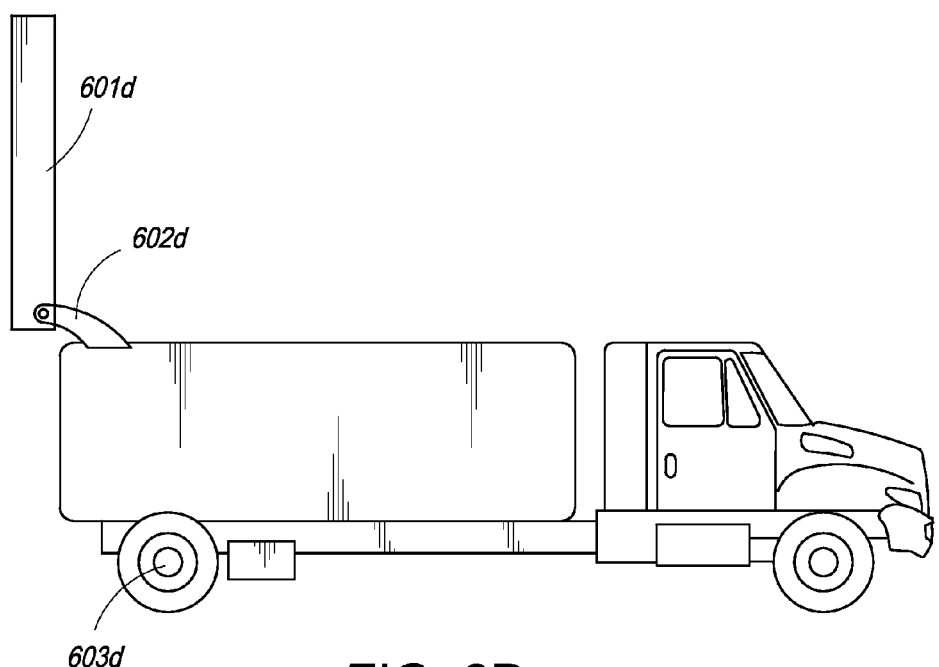
FIG. 6d is a side view diagram of one embodiment of a standard design of the boom of the present invention, illustrating movement of the boom about a hinge point atop the container.

The functioning of the vertical support is further detailed in FIGS. 6c and 6d. As shown in FIG. 6c, the vertical support 601c is in a near horizontal position when not deployed. In one embodiment, the vertical support 601c is at an angle in the range of 5 to 20 degrees to the horizontal, when in stowed away position. A fixed point 602c is provided, over which the vertical support is enabled to extend. Thus for deployment, the position of the vertical support 601c changes from near horizontal in FIG. 6c to vertical as depicted by 601d in FIG. 6d.

The extending action of the vertical support over the fixed point 602c, 602d can be driven by a number of mechanisms including, but not restricted to, one or more hydraulic rams, one or more electric motors and associated gearboxes or a pulley drive system. It is preferable to be able to lock the vertical support in place once it has been extended to the operating configuration or returned to the stowed configuration. This can be achieved by using, by way of example, conical pins (not shown) that pass through a support structure on the truck platform and into suitably located holes in the vertical support. One of ordinary skill in the art would appreciate that other locking mechanisms known in the art can also be used in place of or in addition to the example given.

It may be noted from FIGS. 6c and 6d that substantially all of the weight of the vertical support 601c, 601d acts over, is in alignment with, or is otherwise positioned over the rear axle 603c, 603d of the truck. Therefore, the vertical support 601c, 601d is designed to minimize the overall weight of the mobile inspection container in order to ensure that the rear axle loading is kept to a reasonable level.

In a second embodiment, the boom of the present invention operates in a turntable fashion and comprises a horizontal boom section and a vertical boom section.

Figure 7A:
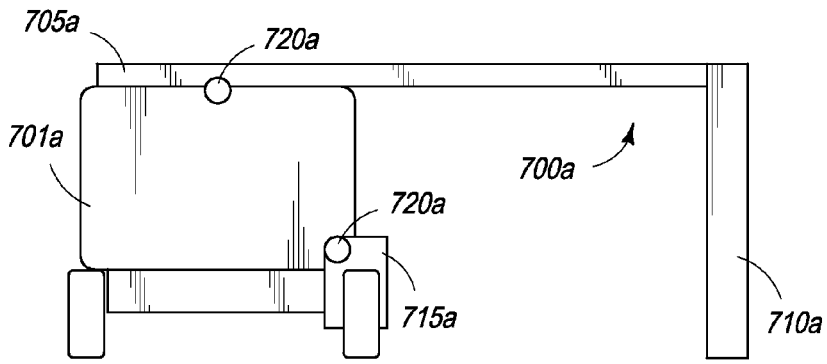
FIG. 7a is a rear view block diagram of one embodiment of a turntable design of the boom of the present invention when fully deployed.

FIG. 7a is a rear view block diagram of one embodiment of a turntable design of the boom 700a of the present invention when fully deployed. In one embodiment, the boom comprises two sections: a horizontal boom section 705a, and a vertical boom section 710a. In this embodiment, an X-ray source 715a is attached to the side of the container 701a. The X-ray source 715a is positioned somewhere between the rear axle and the front of the container 701a. The boom 700a and X-ray source 715a are fixed to a horizontal rail or gantry system 720a that allows for horizontal sliding of both components along the length of the container 701a, between the rear axle and the front of the container 701a. Movement along the rail or gantry system 720a is synced and controlled by a computer so that the two components remain calibrated during use. Lateral movement of the boom 700a and X-ray source 715a is achieved through use of the GUI. Once the boom has been deployed, in one embodiment, the vehicle is scanned by being driven through the scanner. In another embodiment, the vehicle is scanned by being conveyed over a rail guide system. In another embodiment, the vehicle remains stationary and the scanner conveys along the length of said rail or gantry system and scans the vehicle.

Figure 7B:
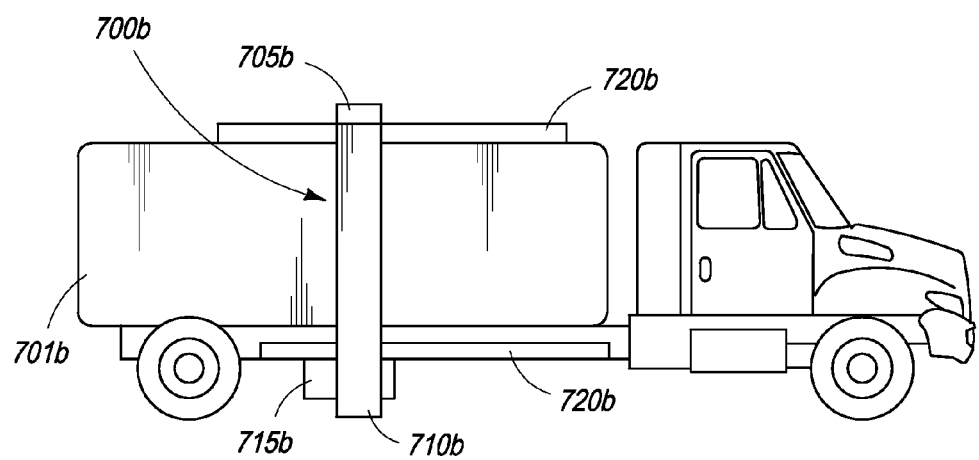
FIG. 7b is a side view block diagram of one embodiment of a turntable design of the boom of the present invention when fully deployed.

FIG. 7b is a side view block diagram of one embodiment of a turntable design of the boom 700b of the present invention when fully deployed. The boom 700b is attached to a rail or gantry system 720b that runs along the top of the container 701b. As mentioned, the boom design of the present embodiment comprises two components—horizontal boom 705b and vertical boom 710b, which in the stowed condition can be folded parallel to each other in a manner that the total space occupied by the boom is minimized. The X-ray source 715b is attached to a rail or gantry system 720b running along the lower side of the container 701b.

Figure 7C:
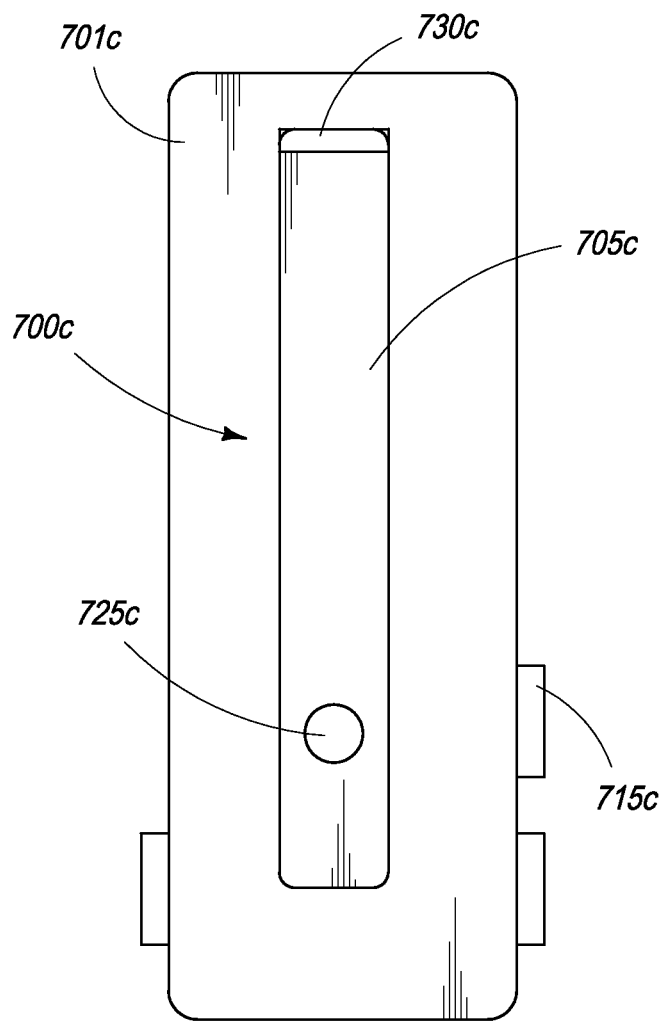
FIG. 7c is a top view block diagram of one embodiment of a turntable design of the boom of the present invention in the stowed configuration.

FIG. 7c is a top view block diagram of one embodiment of a turntable design of the boom 700c of the present invention in the stowed configuration. The X-ray source 715c is attached to a rail or gantry system on the side of the container 701c, allowing for horizontal movement of the X-ray source 715c along the length of the container 701c, between the rear axle and the front of the container 701c. The horizontal section 705c of the boom 700c is capable of pivoting about a pivot point 725c atop the container 701c for deployment of the external scanning system. As would be evident to persons of ordinary skill in the art, rotation at the pivot point is typically controlled, in one embodiment, using electric motor or hydraulic actuator with accompanying sensors to confirm rotation angle. The pivot point 725c is positioned on the rail or gantry system (not shown) atop the container 701c, allowing for horizontal movement of the boom 700c at the pivot point 725c along the length of the container 701c, between the rear axle and the front of the container 701c. In this embodiment, the vertical section of the boom (not shown) is stored underneath the horizontal section 705c and rotates downward from a hinge point 730c at the distal end of the horizontal section 705c after the horizontal section 705c pivots outward from the container 701c.

Figure 7D:
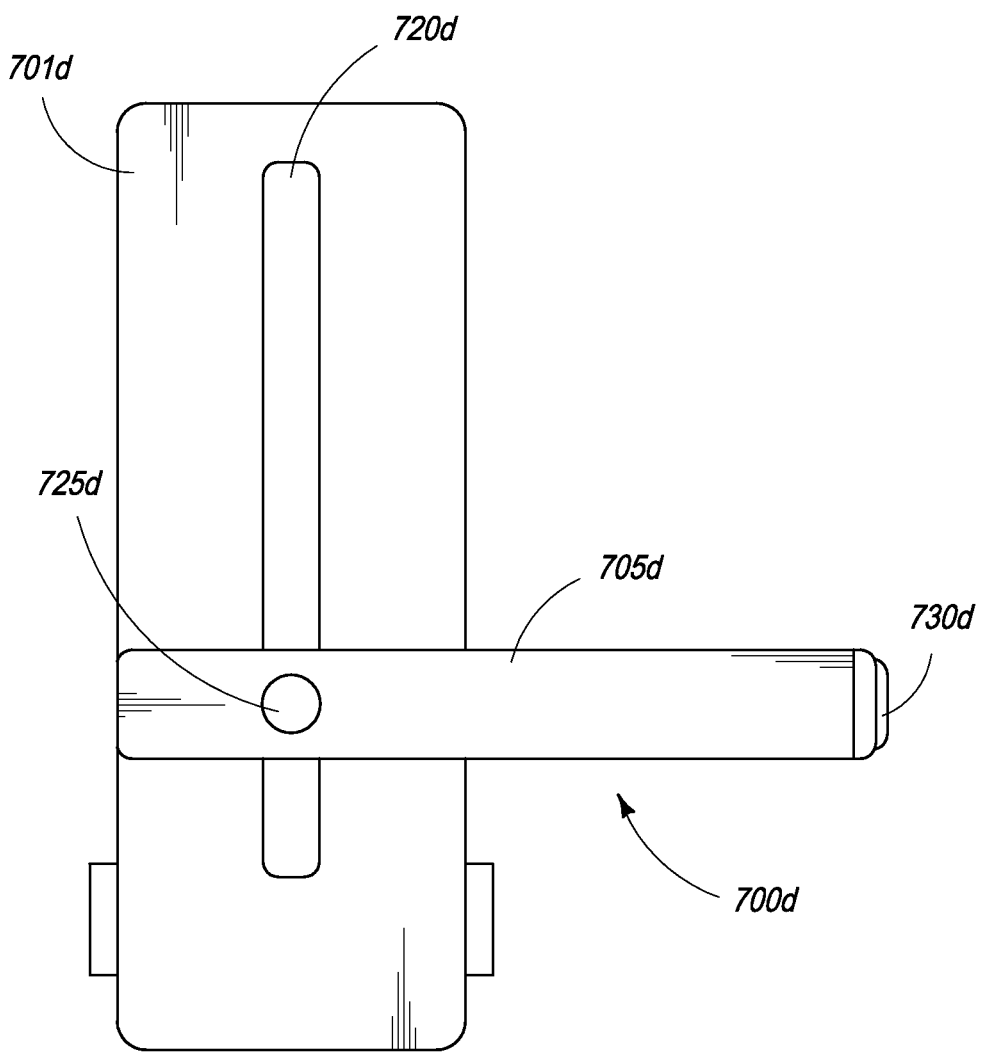
FIG. 7d is a top view block diagram of one embodiment of a turntable design of the boom of the present invention in the fully deployed configuration; and, FIG. 8 is a rear view block diagram of one embodiment of a turntable with vertical lift design of the boom of the present invention in a vertically extended deployed configuration.

FIG. 7d is a top view block diagram of one embodiment of a turntable design of the boom 700d of the present invention in the fully deployed configuration. The horizontal section 705d of the boom 700d has been pivoted about a pivot point 725d atop the container 701d. The pivot point 725d is positioned on the rail or gantry system 720d atop the container 701d, allowing for horizontal movement of the boom 700d at the pivot point 725d along the length of the container 701d, between the rear axle and the front of the container 701d. In this embodiment, the vertical section of the boom (not shown) has been rotated downward from a hinge point 730d at the distal end of the horizontal section 705d, forming the scanning tunnel.

In a third embodiment, the boom of the present invention operates in a turntable fashion and comprises a horizontal boom section and a vertical boom section, and is vertically extendable by use of a hydraulic lift.

Figure 8:
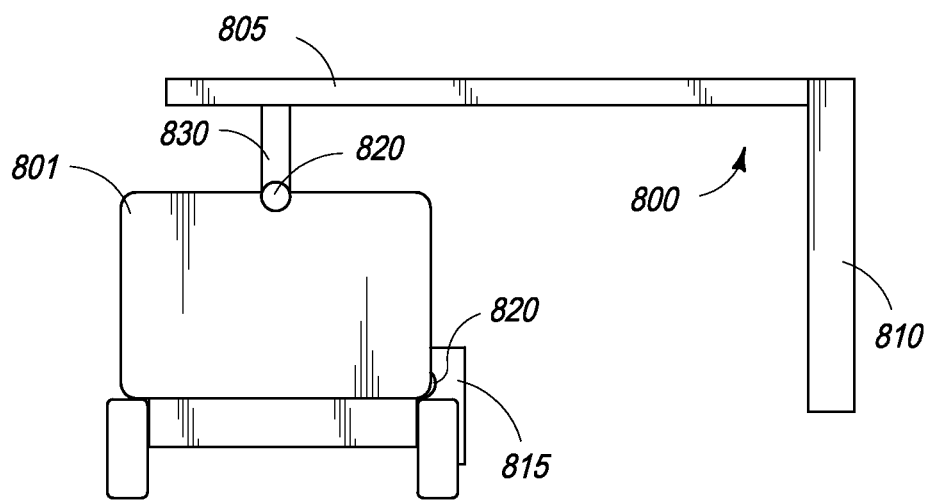

In the turntable with lift embodiment, a hydraulic cylinder or other similar lifting mechanism is included at the pivot point to enable scanning of vehicles with a height greater than that of the inspection container. FIG. 8 is a rear view block diagram of one embodiment of a turntable with vertical lift design of the boom 800 of the present invention in a vertically extended deployed configuration. The boom comprises three sections: a vertical hydraulic cylinder 835, a horizontal boom section 805, and a vertical boom section 810. In this embodiment, an X-ray source 815 is attached to the side of the container 801. The X-ray source 815 is positioned somewhere between the rear axle and the front of the container 801. In one embodiment, the X-ray source is vertically adjustable to compensate for boom lift by use of a telescoping boom portion. The boom 800 and X-ray source 815 are fixed to a horizontal rail or gantry system 820 that allows for horizontal sliding of both components along the length of the container 801, between the rear axle and the front of the container 801. Movement along the rail or gantry system 820 is synced and controlled by a computer so that the two components remain calibrated during use. Lateral movement of the boom 800 and X-ray source 815 is achieved through use of the GUI. Once the boom has been deployed, in one embodiment, the vehicle is scanned by being driven through the scanner. In another embodiment, the vehicle is scanned by being conveyed over a rail guide system. In another embodiment, the vehicle remains stationary and the scanner conveys along the length of said rail or gantry system and scans the vehicle.

In one embodiment, an actuator is used to fold down the vertical section of the boom at the hinge point at the distal end of the horizontal section. Persons of ordinary skill in the art should note that the actuator may be electric motor (with rotary gearbox or linear screw rod actuators), hydraulic cylinder and lever, electric winch and cable (with removable or fixed end points), manual winch and cable (with removable fixed end points) or any other actuator known to those skilled in the art. Rotation at the pivot point allows for boom deployment at angles adjustable in the range 75 degrees to 90 degrees with respect to the scanning direction.

X-ray sources may be selected from any of the following categories:
X-ray tube and generator with 100 kVp to 500 kVp tube voltage and 0.1 mA to 20 mA tube current
0.8 MV to 2.5 MV linear accelerator source with low output dose rate, typically less than 0.1 Gy/min at 1 m.
2.5 MV to 6 MV linear accelerator source with high output dose rate, typically in the range 0.1 Gy/min at 1 m to 10 Gy/min at 1 m.

In one embodiment, booms of the present invention are fitted with lead or steel beam stops to reduce primary beam intensity at the extent of the surrounding radiation exclusion zone. The beam stop is advantageously formed from lead with a thickness of 10 mm to 200 mm depending on the energy of the X-ray source (the higher the energy, the thicker the primary beam stop). The booms are fitted with X-ray detectors to measure the transmitted X-rays from the source through the object under inspection. Typically these detectors are formed from high density scintillation materials such as CdWO4, ZnWO4 or CsI with a thickness in the range 0.3 mm to 50 mm depending on the energy of the X-ray source and the type of transmission measurement being made.

Additionally or optionally, the booms of the present invention are fitted with position sensors to provide feedback to an automated boom deployment system. These sensors advantageously record when actuator motion is complete at both ends of travel. In one embodiment, redundant sensors are deployed for such measurements to mitigate against sensor failure.

In one embodiment for example, it is possible to complete boom deployment in less than 2 minutes. Still faster times may be achieved when suitable strengthening components are fitted to the various booms to mitigate actuator load. Further, boom stowage can also be completed in a similar duration of time.

The horizontal and vertical booms in the scanning system of the present invention are designed to contain as little material as possible. This allows for minimizing the weight, and hence reduces the tipping moment on the truck chassis. Several materials can be selected for manufacturing the booms, including steel, aluminum and composite materials. One of ordinary skill in the art would appreciate that other suitable light weight materials may also be used for this purpose.

Persons of ordinary skill in the art should also note that the boom structures of the present invention allow requisite accuracy of alignment so that X-ray energy levels of less than 2 MeV can be used while also being adequate enough to penetrate 150 mm of steel, in accordance with one embodiment. Further, as a result of the use of lower X-ray energy levels, the embodiments of the present invention use smaller Linacs when compared to prior art systems, thereby saving on overall weight. As a further result of the cumulative weight savings, the present invention allows for an X-ray mobile inspection system with penetration greater than 120 mm of steel, while weighing less than 15,000 kg.

The X-ray system used with the mobile inspection system of the present invention is designed to allow use with a wide range of X-ray sources. The source of radiation may include conventional sources such as a radio-isotopic source or an X-ray tube, as well as Linear Accelerators (LINAC) or any other source known in the art capable of producing beam flux and energy sufficiently high to direct a beam to traverse the space through an object under inspection to detectors at the other side. The choice of source type and its intensity and energy depends upon the sensitivity of the detectors, the radiographic density of the cargo in the space between the source and detectors, radiation safety considerations, and operational requirements, such as the inspection speed.

For example, the system of the present invention could employ source-based systems, cobalt-60 or cesium-137 and further employ the required photomultiplier tubes (PMT) as detectors. If a linear accelerator (LINAC) is optionally employed, then photodiodes and crystals are used in the detector. One of ordinary skill in the art would appreciate how to select a radiation source type, depending upon his or her inspection requirements. In one embodiment, the system is operated with a standard X-ray tube, which typically has energy in the range of 120 kVp to 450 kVp, for applications such as screening cars and small vehicles with or without passengers within the vehicle. In another embodiment, a low energy linear accelerator source, having a typical energy in the range of 0.8 MV to 2 MV, is used for the purposes of screening full size cargo in manifest verification. In yet another embodiment, a higher energy X-ray source, typically with an energy range of 2.5 MV to 6 MV, is used for scanning of full-sized containers. In this case, the image penetration capability of the X-ray source is suitable for detection of a range of illicit materials and devices including narcotics, explosives, currency, alcohol, weapons and improvised explosive devices. Those skilled in the art would further appreciate that the inspection system of the present invention may also be configured with a gamma-ray source such as Co-60 or Cs-137, to replace the X-ray source.

Regardless of whether the radiation source is an X-ray generator or a LINAC, it is mounted on the same single boom as the detector arrays, so that the need for sophisticated alignment systems each time the system is deployed is eliminated. Thus, the radiation source and detectors are substantially permanently aligned on the same single boom. The feature also allows for scanning at various degrees of offset, again without the need to realign the LINAC or X-ray generator and detectors.

The X-ray system of the present invention is further designed to operate with a very compact radiation footprint. As known in the art, X-ray scanning operates on the principle that, as X-rays pass through objects, the radiation gets attenuated, absorbed, and/or deflected owing to a number of different physical phenomena that are indicative of the nature of the material being scanned. In particular, scattering occurs when the original X-ray hits an object and is then deflected from its original path through an angle. These scatter radiations are non-directional and proportional to the total energy delivered in beam path. A narrowly collimated beam will keep the overall radiation dose minimal and therefore also reduce the amount of scatter radiation in the area surrounding the scanner, thereby reducing the "exclusion zone". The exclusion zone is an area around the scanner in which general public are not authorized to enter due to the possibility of their getting exposed to doses of radiations scattered during the scanning process. The exclusion area is dependent upon the magnitude of current setting the intensity of the radiation source. The availability of a large enough area for the "exclusion zone" around the scanner system is one of the factors that influence the decision of positioning the mobile inspection system.

The X-Ray control mechanism of the present invention allows for automatic determination of the frequency and energy of the X-ray beam used for illumination of the vehicle or cargo being inspected. For this purpose, the mechanism takes into account variables such as the start of the driver's cab, the end of the driver's cab, the starting point of the cargo to be inspected and the end point of cargo to be inspected. The X-ray control mechanism comprises two redundant methods for imaging the target vehicle and determining the aforementioned variables. The first method involves use of a scanning laser sensor, which forms a two dimensional image of the height above the road surface of the vehicle being inspected. The second method of imaging the vehicle involves use of a machine vision camera, which is located on the vertical support. The machine vision camera detects vision targets that are placed on the vertical boom on the opposite side. The vision targets are located such that they correspond to different parts of a cargo vehicle. Therefore, the simultaneous analysis of a number of different targets can be used to identify different parts of the vehicle driving through the inspection aperture. By combining signals from the machine vision camera and the scanning laser sensor, a robust control mechanism for switching on the X-ray beam according to the requirements can be implemented.

Penetration performance depends on the energy of the X-ray source. For the system of present invention, the penetration performance is typically in the range of 20-100 mm for X-ray sources below 450 kVp, between 100 mm and 200 mm for sources in the range of 450 kVp to 2 MV and between 200 mm and 400 mm for sources in the range of 2 MV to 6 MV.

In a further aspect of this invention, the X-ray imaging system is integrated with a passive gamma detection system. In this case, one or more large area detectors are located adjacent to the X-ray detector arrays in the horizontal and vertical booms and along the full length of the vertical support. This arrangement provides a large surface area for gamma-ray detection. In one embodiment, the large area gamma ray detectors are advantageously assembled from organic scintillation materials such as an organic plastic scintillator or using in-organic scintillator materials such as NiI (Tl) of CsI(Tl). The gamma-ray detectors are advantageously also configured to allow them to be switched off while the X-ray source is switched on and then re-enabled once the X-ray beam is switched back off again. This is particularly important when using a pulsed linear accelerator source for X-ray imaging where the gamma-ray detectors can be rendered inactive during the X-ray pulse and re-activated immediately following the pulse.

In another configuration, secondary detectors can provide a simultaneous backscatter imaging capability. In this case, X-rays from the main imaging beam may backscatter into a series of detectors which are mounted upon the vertical support. In one embodiment, the detectors may be provided with additional collimation in order to restrict the direction from which backscattered radiation is received. The backscatter image, being correlated in spatial position with the X-ray transmission image, can provide additional information about the presence, or otherwise, of low atomic number materials that are located at, or near to, the surface of the object under inspection adjacent to the X-ray source.

The novel design and the aforementioned features of the present invention enable a cost-effective, safe and completely self-contained scanning system that can be used for non-intrusive inspection of containers, trucks and passenger vehicles. The road mobile configuration and low weight design of the present scanning system allows for transport on difficult terrain, such as in border areas, apart from local roads and highways. Further, since the system takes a very short time (around 15 minutes) to be fully deployed, and there is less operational space required for deployment, it facilitates operation at multiple locations and is efficient at performing high throughput inspections. The system can scan cargo in mobile and stationary mode and the minimal operating area makes it well suited for limited space applications. Some of the other features and benefits of the mobile inspection system of the present invention are:

The boom design allows for more precise linear accelerator to detector alignment. The folded array detector box configuration shortens the distance between X-ray source and the detector, which increases penetration and provides no corner cutoff with less image distortion.

The unique scanning boom assembly can be deployed at either a ninety or an eighty degree offset to the vehicle inspected. This allows maximum flexibility in the setup of operational area while providing excellent hidden compartment and false wall detection capabilities.

One person may deploy the boom with a single button; thus the system is safe, reliable and simple. Stowing the boom is done in the same manner.

The scanning system includes a plurality of CCTV cameras, which provide a view of the operating zone and help maintain safety.

Two modes of operation are supported—Mobile and Portal, which allow for inspection of stationary as well as moving cargos, respectively.

A training mode is provided, which offers images from a training library for simulated scans during inspector training.

The modular design of the scanning boom assembly and imaging system allows it to be easily adapted to truck chassis from several different manufacturers. This allows local trucks to be utilized in various countries and simplifies vehicle maintenance.

In one embodiment, the screening equipment available for vehicle/cargo screening includes a low power transmission X-ray vehicle/cargo screening system that is capable of identifying medium and large truck and car bombs hidden inside of the vehicle. In one embodiment, a boom arm holding X-ray detectors deploys from the boom structure, as described above. In addition, the vehicle screening equipment includes an under-vehicle inspection system, driver identification and recognition system, and license plate identification systems, which are also integrated into the graphical user interface (GUI).

In one exemplary embodiment, when in use, the integrated portable checkpoint system operates via the following method: A person(s) of interest is required to undergo a security scan at a specific location at which the integrated portable checkpoint system has been deployed. The individual(s) exits his or her vehicle and enters one end of the checkpoint container. Once inside, the individual(s) places his or her baggage or personal belongings on the conveyor system of a baggage scanner for scanning. Next, the individual(s) pass through a metal detector which also acts to scan the individual's shoes. Alternately, the individual can remove his or her shoes and place them on the baggage scanner conveyor system for scanning Finally, the individual(s) enters the people screener module for full body scanning The individual(s) then exits through a door at the other end of the container. A security personnel member in the operator room instructs the individual(s) at each step of the scanning process.

While the individual(s) are inside the container being scanned, the external boom scanner scans the vehicle. In one embodiment, the vehicle is slowly driven through the scanner by a security personnel member. In one embodiment, the vehicle passes through the scanner via a conveyor or rail guide. In another embodiment the external boom scanner scans the vehicle by moving over the length of the vehicle. Variations in speed are compensated as described above to insure a clear image is obtained.

Images and information from all scanning, both personal and vehicular, are securely transmitted for review to the security personnel member in the operator room and appear on the GUI on the operator station.

In one embodiment, when a specific threat is detected, such as an IED, the GUI automatically and instantaneously transmits a signal blocking transmission to prevent the remote detonation of said device by a cellular signal. This provides an additional layer of security and helps to prevent the security personnel members and others nearby from being injured or killed. Once the detonation signal has been successfully jammed, security personnel members can act to neutralize any remaining threat posed by the individual(s) being scanned.

The above examples are merely illustrative of the many applications of the system of present invention. Although only a few embodiments of the present invention have been described herein, it should be understood that the present invention might be embodied in many other specific forms without departing from the spirit or scope of the invention. For example, other configurations of cargo, tires, tankers, doors, airplane, packages, boxes, suitcases, cargo containers, automobile semi-trailers, tanker trucks, railroad cars, and other similar objects under inspection can also be considered. Therefore, the present examples and embodiments are to be considered as illustrative and not restrictive, and the invention may be modified within the scope of the appended claims.

We claim:

1. A system for inspecting objects comprising:
a housing adapted to be carried by a vehicle, wherein said housing comprises a length extending from a position proximal to a cab of said vehicle to a position distal to said cab, wherein said housing comprises a plurality of walls, including a first end wall proximal to said cab, a second end wall distal to said cab and opposing the first end wall, a first side wall and a second side wall opposing the first side wall, each of said first side wall and second side wall extending from the first end wall to the second end wall, wherein the first end wall, first side wall and second side wall define a first enclosed internal volume, wherein the second end wall, first side wall and second side wall define a second enclosed internal volume, which is separated from said first enclosed internal volume by an interior wall, and wherein the second enclosed internal volume comprises an entrance and an exit located on the first side wall, said entrance being proximate the interior wall, said exit being proximate the second end wall, and said entrance and exit defining a pathway through the second internal volume, and wherein a portion of said plurality of walls comprise reinforced steel;
a metal detector positioned along the pathway within the second enclosed internal volume;
a X-ray scanner positioned along the pathway within the second enclosed internal volume and proximate to said metal detector; and
a control system in data communication with said metal detector and said X-ray scanner, wherein said control system is positioned within said first enclosed internal volume.

2. The system of claim 1 further comprising a system for non-invasively inspecting a human body scanner.

3. The system of claim 2 wherein said human body scanner is X-ray based or millimeter wave based.

4. The system of claim 1 further comprising a deployable boom, having a length and a width, positioned on a top surface of said housing and external to said first and second enclosed volumes.

5. The system of claim 4 wherein said boom comprises a first vertical portion, a horizontal portion, and a second vertical portion.

6. The system of claim 4 wherein said top surface has an area defined by a periphery and wherein the length and width of the boom does not extend beyond said periphery when said boom is in an undeployed state.

7. The system of claim 4 wherein said boom forms an inspection volume when deployed.

8. The system of claim 5 wherein said inspection volume is defined by the first vertical portion, the horizontal portion, and the second vertical portion, and wherein each of said first vertical portion, the horizontal portion, and the second vertical portion extend beyond said periphery.

9. A system for inspecting objects comprising:
a first housing, defining a first enclosed internal volume and having a first top surface, wherein said first housing encloses at least one of a first metal detector or a first X-ray scanner positioned within the first enclosed internal volume and wherein said first housing is adapted to be carried by a vehicle;
a second housing, defining a second enclosed internal volume and having a second top surface, wherein said second housing encloses at least one of a second metal detector or a second X-ray scanner positioned within the second enclosed internal volume and said second housing is adapted to be carried by the vehicle;
a towing mechanism configured to couple the first housing to the second housing;
a transition cabin positioned over said towing mechanism and adapted to permit a person to move between the first housing and second housing; and
a control system in data communication with a) said first metal detector and/or said first X-ray scanner and b) said second metal detector and/or said second X-ray scanner.

10. The system of claim 9 further comprising a deployable boom, having a length and a width, positioned on the first or second top surface and external to the first and second enclosed internal volumes.

11. The system of claim 10 wherein said boom comprises a first vertical portion, a horizontal portion, and a second vertical portion.

12. The system of claim 10 wherein said first and second top surfaces each have an area defined by a periphery and wherein the length and width of the boom does not extend beyond said periphery of the first or second top surfaces when the boom is in an undeployed state.

13. The system of claim 10 wherein said boom forms an inspection volume when deployed.

14. The system of claim 9 further comprising a system for non-invasively inspecting a human body scanner.

15. The system of claim 13 wherein said human body scanner is X-ray based or millimeter wave based.

* * * * *